US010120089B2

(12) United States Patent
Ma et al.

(10) Patent No.: US 10,120,089 B2
(45) Date of Patent: Nov. 6, 2018

(54) IDENTIFYING CORRELATIONS BETWEEN STIMULATED RESERVOIR VOLUME PARAMETERS AND FRACTURE NETWORK PARAMETERS

(71) Applicant: Halliburton Energy Services, Inc., Houston, TX (US)

(72) Inventors: Jianfu Ma, Sugar Land, TX (US); Avi Lin, Houston, TX (US); Baidurja Ray, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 74 days.

(21) Appl. No.: 15/129,768

(22) PCT Filed: Apr. 30, 2014

(86) PCT No.: PCT/US2014/036081
§ 371 (c)(1),
(2) Date: Sep. 27, 2016

(87) PCT Pub. No.: WO2015/167507
PCT Pub. Date: Nov. 5, 2015

(65) Prior Publication Data
US 2017/0131419 A1     May 11, 2017

(51) Int. Cl.
*G01V 1/28* (2006.01)

(52) U.S. Cl.
CPC ........ *G01V 1/288* (2013.01); *G01V 2210/646* (2013.01)

(58) Field of Classification Search
CPC .................. G01V 1/288; G01V 2210/646
See application file for complete search history.

(56) References Cited

U.S. PATENT DOCUMENTS

| 9,176,245 | B2 * | 11/2015 | Craig | G01V 1/282 |
| 9,529,104 | B2 * | 12/2016 | Ma | E21B 43/26 |
| 9,551,208 | B2 * | 1/2017 | Ma | E21B 43/26 |
| 2012/0106292 | A1 | 5/2012 | Fuller et al. | |
| 2012/0318500 | A1 | 12/2012 | Urbancic et al. | |
| 2014/0076543 | A1 | 3/2014 | Ejofodomi et al. | |
| 2014/0083687 | A1 | 3/2014 | Poe et al. | |

FOREIGN PATENT DOCUMENTS

| WO | 2010115211 A1 | 10/2010 |
| WO | 2015167507 A2 | 11/2015 |

* cited by examiner

*Primary Examiner* — Bryan Bui
(74) *Attorney, Agent, or Firm* — John W. Wustenberg; Parker Justiss, P.C.

(57) ABSTRACT

In some aspects, a stimulated reservoir volume (SRV) parameter for a stimulation treatment applied to a subterranean region is identified. A parameter of a fracture-plane network generated by application of the stimulation treatment is identified. A correlation between the SRV parameter and the fracture-plane network parameter is identified. In some implementations, the SRV and the fracture-plane network are computed based on microseismic event data associated with the stimulation treatment.

19 Claims, 13 Drawing Sheets

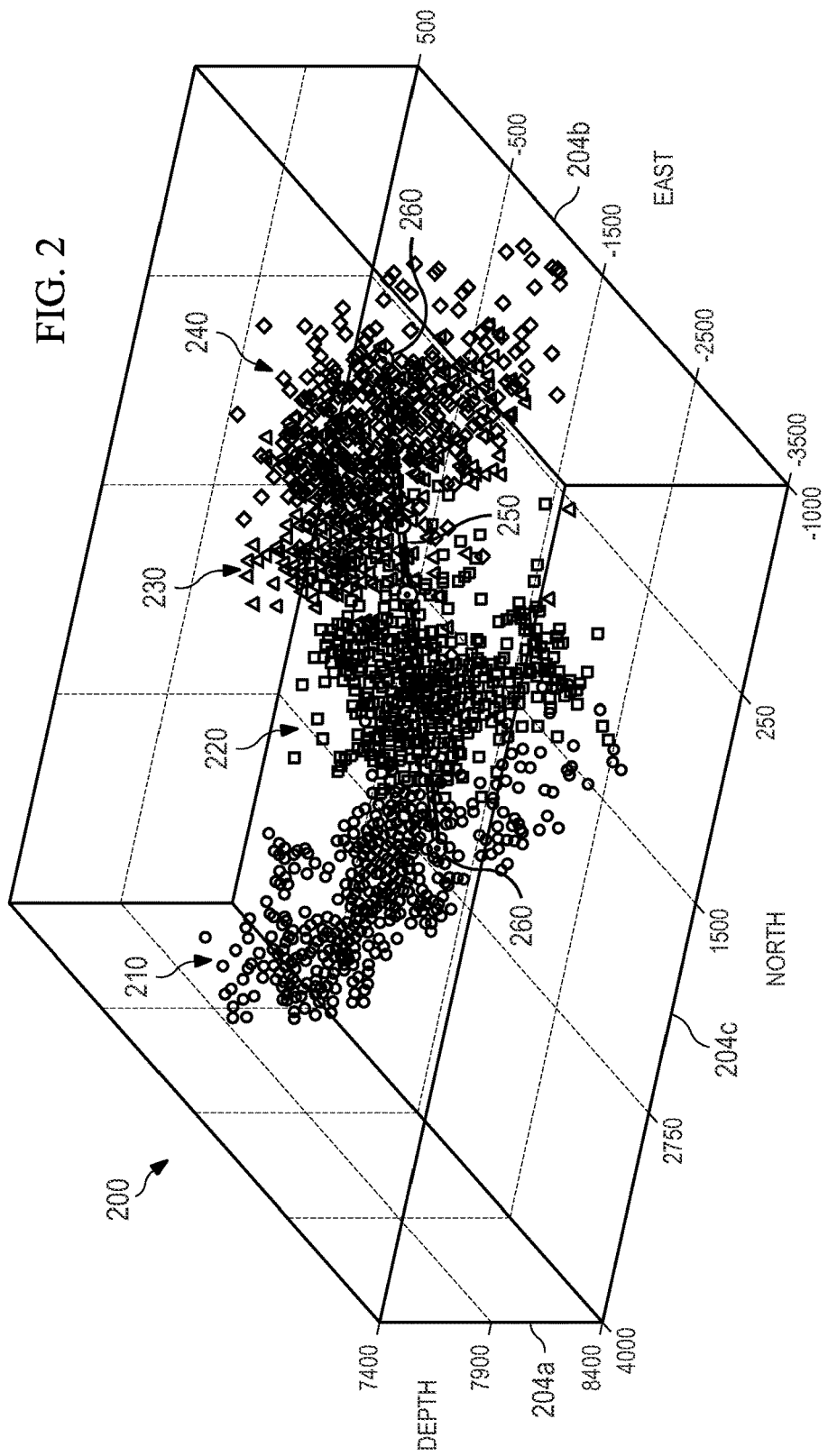

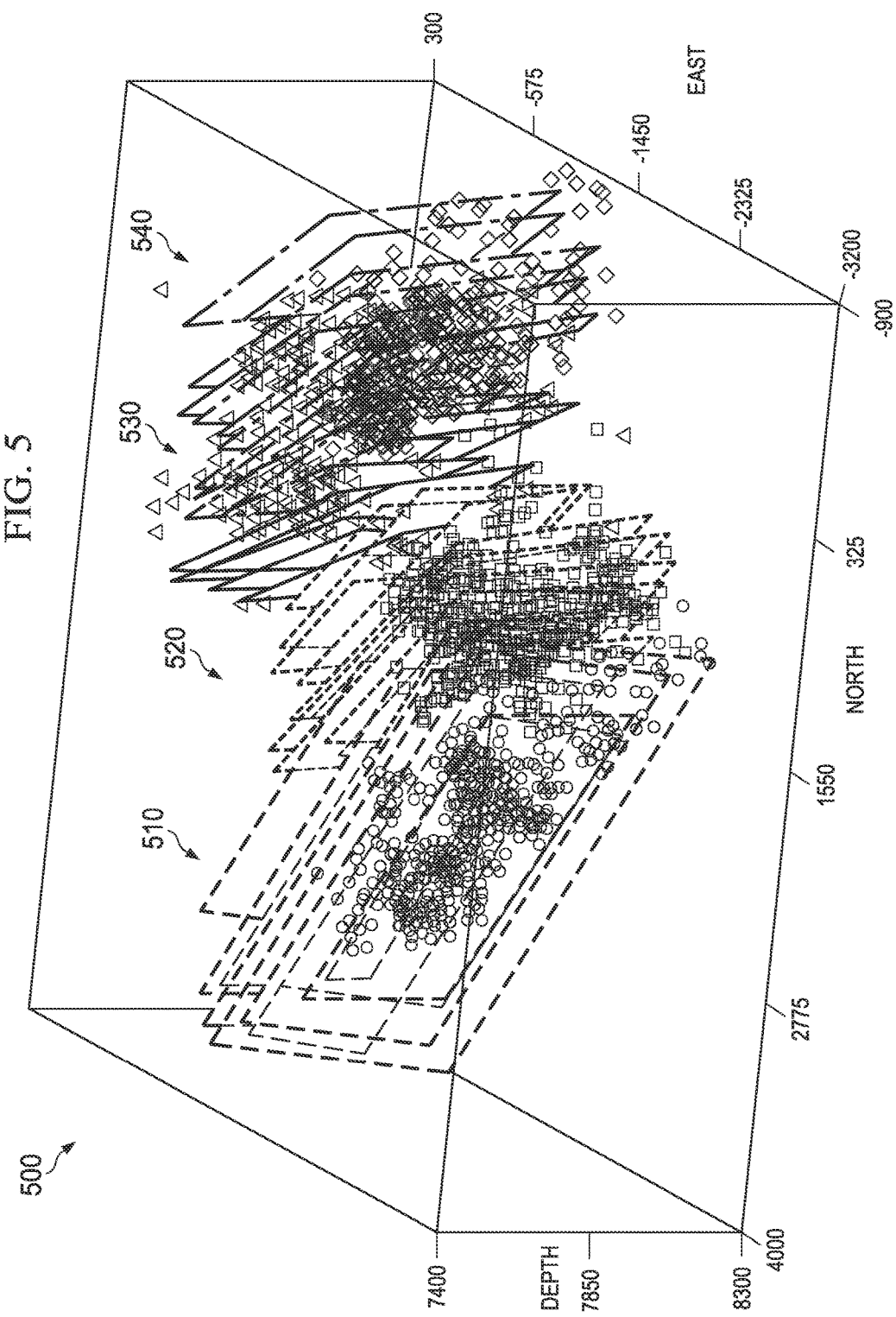

Table 1:

| SRV | Volume (ft³) | Length (ft) | Width (ft) | Height (ft) | Azimuth (degree) |
|---|---|---|---|---|---|
| | 7.83×10⁸ | 3676.30 | 1058.32 | 648.34 | 38.96° |
| Primary Fracture Family | No. Planes | Dip angle (degree) | Length (ft) | Height (ft) | Spacing (ft) |
| | 13 | 76.56 ± 5.65 | 2788.0 ± 412.9 | 470.2 ± 128.6 | 64.1 ± 19.3 |
| | Azimuth (degree) | | | | |
| | 33.12 ± 0.29 | | | | |

SRV and Primary Fracture Family at Stage 1

FIG. 6

Table 2:

| SRV | Volume (ft³) | Length (ft) | Width (ft) | Height (ft) | Azimuth (degree) |
|---|---|---|---|---|---|
| | 9.57×10⁸ | 2301.90 | 1604.84 | 807.90 | 38.15° |
| Primary Fracture Family | No. Planes | Dip angle (degree) | Length (ft) | Height (ft) | Spacing (ft) |
| | 20 | 78.86 ± 4.25 | 1338.9 ± 402.9 | 505.2 ± 152.1 | 65.5 ± 49.4 |
| | Azimuth (degree) | | | | |
| | 41.61 ± 0.67 | | | | |

SRV and Primary Fracture Family at Stage 2

FIG. 7

Table 3: SRV and Primary Fracture Family at Stage 3

| SRV | Volume (ft³) | Length (ft) | Width (ft) | Height (ft) | Azimuth (degree) |
|---|---|---|---|---|---|
| | 7.74×10⁸ | 2408.80 | 1368.36 | 781.84 | 53.25° |
| Primary Fracture Family | No. Planes | Azimuth (degree) | Dip angle (degree) | Length (ft) | Height (ft) | Spacing (ft) |
| | 14 | 58.0 ± 1.08 | 77.63 ± 3.32 | 1169.3 ± 433.7 | 513.0 ± 210.9 | 79.0 ± 23.5 |

FIG. 8

Table 4: SRV and Primary Fracture Family at Stage 4

| SRV | Volume (ft³) | Length (ft) | Width (ft) | Height (ft) | Azimuth (degree) |
|---|---|---|---|---|---|
| | 8.73×10⁸ | 2288.30 | 1567.40 | 694.50 | 55.26° |
| Primary Fracture Family | No. Planes | Azimuth (degree) | Dip angle (degree) | Length (ft) | Height (ft) | Spacing (ft) |
| | 15 | 50.0 ± 0.56 | 75.67 ± 4.36 | 1477.0 ± 234.4 | 553.5 ± 173.9 | 73.1 ± 24.3 |

FIG. 9

| Table 5: | Overlapping volumes between two adjacent stages | | |
|---|---|---|---|
| | Stage 1 and Stage 2 | Stage 2 and Stage 3 | Stage 3 and Stage 4 |
| Volume (ft$^3$) | $8.56\times10^7$ | $9.09\times10^7$ | $4.16\times10^8$ |
| Percentage over last stage | 9.0% | 11.7% | 47.7% |

FIG. 10

| Table 6: | Total SRV (ft$^3$): $2.79\times10^9$ | | | |
|---|---|---|---|---|
| stage | Stage 1 | Stage 2 | Stage 3 | Stage 4 |
| Effective SRV (ft$^3$) | $7.83\times10^8$ | $8.714\times10^8$ | $6.831\times10^8$ | $4.57\times10^8$ |
| Effectiveness | 100% | 91% | 88.3% | 52.3% |
| Contribution | 28.06% | 31.23% | 24.48% | 16.23% |

FIG. 11

IDENTIFYING CORRELATIONS BETWEEN STIMULATED RESERVOIR VOLUME PARAMETERS AND FRACTURE NETWORK PARAMETERS

CROSS-REFERENCE TO RELATED APPLICATION

This application is the National Stage of, and therefore claims the benefit of, International Application No. PCT/US2014/036081 filed on Apr. 30, 2014, entitled "IDENTIFYING CORRELATIONS BETWEEN STIMULATED RESERVOIR VOLUME PARAMETERS AND FRACTURE NETWORK PARAMETERS," which was published in English under International Publication Number WO 2015/167507 on Nov. 5, 2015. The above application is commonly assigned with this National Stage application and is incorporated herein by reference in its entirety.

BACKGROUND

The following description relates to identifying correlations between stimulated reservoir volume (SRV) parameters and fracture network parameters.

In a typical fracture treatment, fluids are injected in a subterranean formation at high pressure to induce fractures in the formation. Fracture treatments are typically applied to enhance hydrocarbon productivity of the formation. The stresses induced by the pressures generated by the fracture treatment can generate microseismic events in the subterranean formation, and the events can be detected by sensors and collected for analysis.

DESCRIPTION OF DRAWINGS

FIG. 2 is a plot showing example microseismic event data collected from a multi-stage stimulation treatment.

FIG. 5 is a plot showing example fracture networks generated by application of respective stages of a multi-stage stimulation treatment.

FIGS. 6-9 are tables showing example SRV parameters and fracture network parameters associated with respective stages of a multi-stage stimulation treatment.

FIGS. 10 and 11 are tables showing example SRV parameters associated with respective stages of a multi-stage stimulation treatment.

Like reference symbols in the various drawings indicate like elements.

DETAILED DESCRIPTION

Figure 1A:
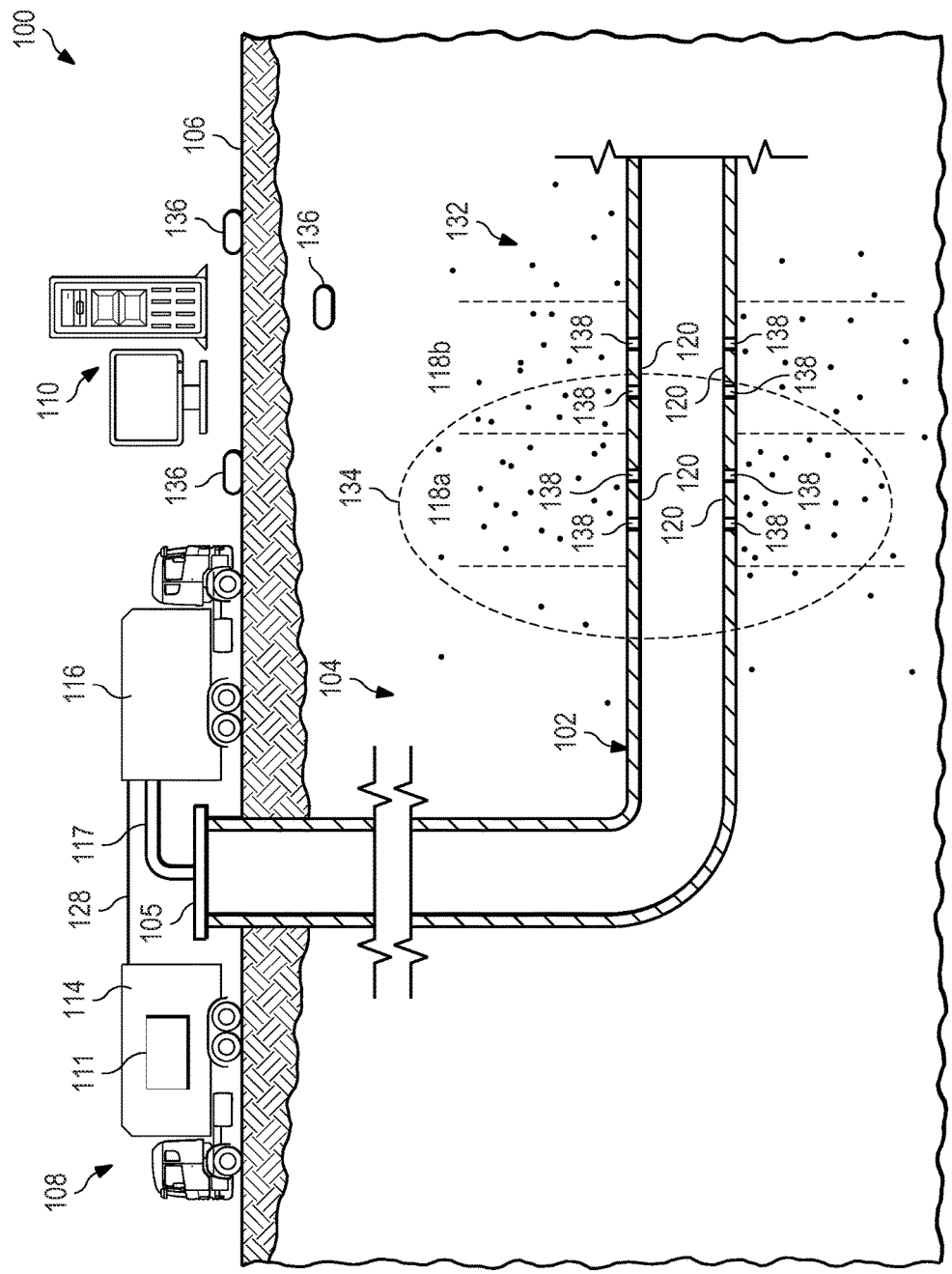
FIG. 1A is a schematic diagram of an example well system.

In some aspects of what is described here, correlations between parameters of a stimulated reservoir volume (SRV) and parameters of a fracture network generated by application of a stimulation treatment of a subterranean region are considered. SRV parameters can describe geometric, physical, or other properties of the region (e.g., the stimulated rock) affected by application of the stimulation treatment. Fracture network parameters can include information about fracture patterns in the fracture network. The SRV parameters and fracture network parameters can be correlated quantitatively and/or qualitatively, for example, by identifying a trend or relationship between the parameters. Example techniques are described for identifying the correlations between stimulated rocks and hydraulic fracture patterns based on the SRV parameters and the fracture network parameters. The correlations can provide more comprehensive information of the stimulated rock and hydraulic fracture patterns, which can be used, for example, in complex fracture penetration and propagation models for treatment simulations, in reservoir simulators for hydrocarbon production forecasting, in performance analysis of unconventional well systems, etc.

A stimulation treatment can include, for example, an injection treatment (e.g., a hydraulic fracture treatment), a flow-back treatment, or another treatment. In some instances, a stimulation treatment can include multiple individual treatment stages. Microseismic events can be generated by the stimulation treatment and can be collected, for example, during the stimulation treatment (e.g., on a stage-by-stage basis for a multi-stage stimulation treatment). In some implementations, the SRV, the fracture network, their respective parameters, interaction quantities between different stimulation stages, or other information can be computed or otherwise identified from the same microseismic event data to fully characterize the multi-stage stimulation treatment.

In some instances, the stimulated reservoir's hydrocarbon productivity does not only depend on SRV at each stage, but also on the distribution of hydraulic fractures, as well as the fracture interaction between treatment stages. In some cases, there is a coherent correlation between the hydrocarbon production and the overall treatment SRV, e.g., the larger SRV is, the more production is experienced. In addition to estimating the mathematical 3D volume of the SRV as a measurement of stimulated rock volume that contains the fracture network, example techniques for providing further details and quantified SRV geometry are described, helping treatment engineers and well operators understand the lateral extension and development of SRV at each stage. Example SRV parameters include the length, width, height, and azimuthal orientation of the SRV. In some implementations, the SRV parameters can be identified and presented for each treatment stage (e.g., listed in a table, displayed in a 3D graph showing the SRV's geometries, etc.).

In some instances, however, the SRV alone does not provide enough information about fracture spacing and the complexity of fracture network within the SRV. To accurately predict the hydrocarbon productivity, the information about the fracture network within the SRV can be analyzed. The fracture network can include a network of fracture planes (also referred to as a fracture-plane network, a fracture pattern, or a fracture planes' system). The fracture-plane network or fracture pattern can include, for example, hydraulic fractures that are generated by the stimulation treatment, natural fractures that are extended or expanded by the application of the stimulation treatment, or other types of fractures. The fracture-plane network or fracture pattern can include multiple fractures with substantially the same or similar orientations. The fracture-plane network or fracture pattern also can include interconnected, irregular, or otherwise displaced fractures in the stimulated subterranean region.

Fracture network parameters (also referred to as fracture-plane network parameters) can provide for example, fracture azimuth, fracture dip angle, fracture size (length, height, area), fracture spacing (density), fracture families, complexity, or other properties of the fracture-plane network. In some implementations, a fracture network that includes one or more families of fractures or sets of planes and its associated parameters can be identified, for example, by fracture matching techniques based on microseismic events data. In some instances, for each stage, some or all of the statistical fracture network parameters (e.g., fracture parameters of the primary fracture family) can be listed in a table, displayed in a plot showing the identified fracture planes, or otherwise presented. The detailed information about a fracture network can be provided as inputs for complex fracture propagation models of reservoir simulators for production forecasting and well-performance analysis.

In some instances, the fracture network information does not fully represent the connection or interaction between physical treatment stages, as well as the stimulation effectiveness of hydraulic fracturing efforts. The SRV can act as the boundary and interface between the stimulated fracture network and the un-fractured reservoir, and also acts as a container of stimulated fracture network and detected microseismic activity. The length, width and height of the SRV can be obtained by enclosing it, for example, via an ellipsoid. The parameters of overlapping volumes intersected by SRVs between successive different treatment stages can reveal the interaction, connection and communication of hydraulic fractures between these stages, inferring the loss of treatment fluid. The correlations of the SRV parameters and fracture network parameters can also describe the close relationship between the SRV and the primary fracture family. For example, in some cases, at each stage of a multi-stage treatment, the respective orientation azimuths of the SRV and the primary fracture family are consistent to each other; the length of SRV (e.g., along the major axis), is proportional to the fracture length; the width of SRV (e.g., along secondary axis) is related to the number of individual fractures of the primary fracture family. Hence, the combination and correlations of the SRV parameters and fracture network parameters can assist in characterizing the stimulation treatment.

The techniques described here can be performed at any time, for example, before, during, or after a treatment or other event. In some instances, the techniques described here can be implemented in real time, for example, during a stimulation treatment. In some instances, the techniques described here can provide physical geometry and quantity of stimulated reservoir volume at each treatment stage, provide attributes of hydraulic fracture patterns at each stage, provide information of interactions and connections between different stages, quantitatively describe the correlation between hydraulic fracture network and stimulated rock by appropriate geometric and physical parameters of the fracture network and SRV, or achieve additional or different features. The techniques can allow field engineers, operators and analysts, to graphically visualize the geophysical geometry of stimulated reservoir volume and hydraulic fracture patterns, to quantitatively compare their properties, and dynamically control the development of the stimulation treatment to enhance hydrocarbon productivity.

FIG. 1A is a diagram of an example well system 100 with a computing subsystem 110. The example well system 100 includes a wellbore 102 in a subterranean region 104 beneath the ground surface 106. The example wellbore 102 shown in FIG. 1A includes a horizontal wellbore. However, a well system may include any combination of horizontal, vertical, slant, curved, or other wellbore orientations. The well system 100 can include one or more additional treatment wells, observation wells, or other types of wells.

The computing subsystem 110 can include one or more computing devices or systems located at the wellbore 102, or in other locations. The computing subsystem 110 or any of its components can be located apart from the other components shown in FIG. 1A. For example, the computing subsystem 110 can be located at a data processing center, a computing facility, or another suitable location. The well system 100 can include additional or different features, and the features of the well system can be arranged as shown in FIG. 1A or in another configuration.

The example subterranean region 104 may include a reservoir that contains hydrocarbon resources, such as oil, natural gas, or others. For example, the subterranean region 104 may include all or part of a rock formation (e.g., shale, coal, sandstone, granite, or others) that contain natural gas. The subterranean region 104 may include naturally fractured rock or natural rock formations that are not fractured to any significant degree. The subterranean region 104 may include tight gas formations of low permeability rock (e.g., shale, coal, or others).

The example well system 100 shown in FIG. 1A includes an injection system 108. The injection system 108 can be used to perform a stimulation treatment that includes, for example, an injection treatment and a flow back treatment. During an injection treatment, fluid is injected into the subterranean region 104 through the wellbore 102. In some instances, the injection treatment fractures part of a rock formation or other materials in the subterranean region 104. In such examples, fracturing the rock may increase the surface area of the formation, which may increase the rate at which the formation conducts fluid resources to the wellbore 102.

A fracture treatment can be applied at a single fluid injection location or at multiple fluid injection locations in a subterranean region, and the fluid may be injected over a single time period or over multiple different time periods. In some instances, a fracture treatment can use multiple different fluid injection locations in a single wellbore, multiple fluid injection locations in multiple different wellbores, or any suitable combination. Moreover, the fracture treatment can inject fluid through any suitable type of wellbore, such as, for example, vertical wellbores, slant wellbores, horizontal wellbores, curved wellbores, or any suitable combination of these and others.

The example injection system 108 can inject treatment fluid into the subterranean region 104 from the wellbore 102. The injection system 108 includes instrument trucks 114, pump trucks 116, and an injection treatment control subsystem 111. The example injection system 108 may include other features not shown in the figures. The injection system 108 may apply injection treatments that include, for example, a single-stage injection treatment, a multi-stage injection treatment, a mini-fracture test treatment, a follow-on fracture treatment, a re-fracture treatment, a final fracture treatment, other types of fracture treatments, or a combination of these.

The example injection system 108 in FIG. 1A uses multiple treatment stages or intervals 118a and 118b (collectively "stages 118"). The injection system 108 may delineate fewer stages or multiple additional stages beyond the two example stages 118 shown in FIG. 1A. The stages 118 may each have one or more perforation clusters 120. A perforation cluster can include one or more perforations 138. Fractures in the subterranean region 104 can be initiated at or near the perforation clusters 120 or elsewhere. The stages 118 may have different widths, or the stages 118 may be uniformly distributed along the wellbore 102. The stages 118 can be distinct, non-overlapping (or overlapping) injection zones along the wellbore 102. In some instances, each of the multiple treatment stages 118 can be isolated, for example, by packers or other types of seals in the wellbore 102. In some instances, each of the stages 118 can be treated individually, for example, in series along the extent of the wellbore 102. The injection system 108 can perform identical, similar, or different injection treatments at different stages.

The pump trucks 116 can include mobile vehicles, immobile installations, skids, hoses, tubes, fluid tanks, fluid reservoirs, pumps, valves, mixers, or other types of structures and equipment. The example pump trucks 116 shown in FIG. 1A can supply treatment fluid or other materials for the injection treatment. The pump trucks 116 may contain multiple different treatment fluids, proppant materials, or other materials for different stages of a stimulation treatment.

The example pump trucks 116 can communicate treatment fluids into the wellbore 102, for example, through a conduit, at or near the level of the ground surface 106. The treatment fluids can be communicated through the wellbore 102 from the ground surface 160 level by a conduit installed in the wellbore 102. The conduit may include casing cemented to the wall of the wellbore 102. In some implementations, all or a portion of the wellbore 102 may be left open, without casing. The conduit may include a working string, coiled tubing, sectioned pipe, or other types of conduit.

The instrument trucks 114 can include mobile vehicles, immobile installations, or other suitable structures. The example instrument trucks 114 shown in FIG. 1A include an injection treatment control subsystem 111 that controls or monitors the stimulation treatment applied by the injection system 108. The communication links 128 may allow the instrument trucks 114 to communicate with the pump trucks 116, or other equipment at the ground surface 106. Additional communication links may allow the instrument trucks 114 to communicate with sensors or data collection apparatus in the well system 100, remote systems, other well systems, equipment installed in the wellbore 102 or other devices and equipment.

The example injection treatment control subsystem 111 shown in FIG. 1A controls operation of the injection system 108. The injection treatment control subsystem 111 may include data processing equipment, communication equipment, or other systems that control stimulation treatments applied to the subterranean region 104 through the wellbore 102. The injection treatment control subsystem 111 may include or be communicably linked to a computing system (e.g., the computing subsystem 110) that can calculate, select, or optimize fracture treatment parameters for initialization, propagation, or opening fractures in the subterranean region 104. The injection treatment control subsystem 111 may receive, generate or modify a stimulation treatment plan (e.g., a pumping schedule) that specifies properties of a stimulation treatment to be applied to the subterranean region 104.

The stimulation treatment, as well as other activities and natural phenomena, can generate microseismic events in the subterranean region 104. In the example shown in FIG. 1A, the injection system 108 has caused multiple microseismic events 132 during a multi-stage injection treatment. A subset 134 of microseismic events are shown inside a circle. In some implementations, the subset 134 of microseismic events are events associated with a single treatment stage (e.g., treatment stage 118a) of a multi-stage injection treatment. In some implementations, the subset 134 of microseismic events can be identified based on the time that they occurred, and the subset 134 can be filtered or otherwise modified to exclude outliers or other event points. The subset 134 of microseismic events can be selected from a superset of microseismic events based on any suitable criteria. In some cases, the subset 134 of microseismic events are used to identify an SRV for the stage 118a or another aspect of an injection treatment.

The microseismic event data can be collected from the subterranean region 104. For example, the microseismic data can be collected by one or more sensors 136 associated with the injection system 108, or the microseismic data can be collected by other types of systems. The microseismic information detected in the well system 100 can include acoustic signals generated by natural phenomena, acoustic signals associated with a stimulation treatment applied through the wellbore 102, or other types of signals. For instance, the sensors 136 may detect acoustic signals generated by rock slips, rock movements, rock fractures or other events in the subterranean region 104. In some instances, the locations of individual microseismic events can be determined based on the microseismic data. Microseismic events in the subterranean region 104 may occur, for example, along or near induced hydraulic fractures. The microseismic events may be associated with pre-existing natural fractures or hydraulic fracture planes induced by fracturing activities.

The wellbore 102 shown in FIG. 1A can include sensors 136, microseismic array, and other equipment that can be used to detect microseismic information. The sensors 136 may include geophones or other types of listening equipment. The sensors 136 can be located at a variety of positions in the well system 100. In FIG. 1A, sensors 136 are installed at the surface 160 and beneath the surface 160 (e.g., in an observation well (not shown)). Additionally or alternatively, sensors may be positioned in other locations above or below the surface 106, in other locations within the wellbore 102, or within another wellbore (e.g., another treatment well or an observation well). The wellbore 102 may include additional equipment (e.g., working string, packers, casing, or other equipment) not shown in FIG. 1A.

In some cases, all or part of the computing subsystem 110 can be contained in a technical command center at the well site, in a real-time operations center at a remote location, in another appropriate location, or any suitable combination of these. The well system 100 and the computing subsystem 110 can include or access any suitable communication infrastructure. For example, well system 100 can include multiple separate communication links or a network of interconnected communication links. The communication links can include wired or wireless communications systems. For example, the sensors 136 may communicate with the instrument trucks 114 or the computing subsystem 110 through wired or wireless links or networks, or the instrument trucks 114 may communicate with the computing subsystem 110 through wired or wireless links or networks. The communication links can include a public data network, a private data network, satellite links, dedicated communication channels, telecommunication links, or any suitable combination of these and other communication links.

The computing subsystem 110 can analyze microseismic data collected in the well system 100. For example, the computing subsystem 110 may analyze microseismic event data from a stimulation treatment of a subterranean region 104. Microseismic data from a stimulation treatment can include data collected before, during, or after fluid injection. The computing subsystem 110 can receive the microseismic data at any suitable time. In some instances, the computing subsystem 110 receives the microseismic data in real time (or substantially in real time) during the fracture treatment. For example, the microseismic data may be sent to the computing subsystem 110 immediately upon detection by the sensors 136. In some instances, the computing subsystem 110 receives some or all of the microseismic data after the fracture treatment has been completed. The computing subsystem 110 can receive the microseismic data in any suitable format. For example, the computing subsystem 110 can receive the microseismic data in a format produced by microseismic sensors or detectors, or the computing subsystem 110 can receive the microseismic data after the microseismic data has been formatted, packaged, or otherwise processed. The computing subsystem 110 can receive the microseismic data, for example, by a wired or wireless communication link, by a wired or wireless network, or by one or more disks or other tangible media.

The computing subsystem 110 can perform, for example, fracture mapping and matching based on collected microseismic event data to identify one or more fracture planes and identify one or more fracture network parameters of the fracture network generated by application of a stimulation treatment of a subterranean region. The fracture network parameters can include, for example, one or more spatial extents (e.g., length, width, or height), fracture orientation (e.g., azimuth and dip angle), fracture size (e.g., surface area of a fracture plane), fracture spacing, fracture complexity, or other parameters that reflects the fracture trends and fracture network characteristics.

In some implementations, the computing subsystem 110 can compute an SRV generated by application of the stimulation treatment of the subterranean region, and can identify one or more parameters of the SRV. The SRV parameters can include, for example, spatial extent (e.g., length, width, or height), SRV size (e.g., volume), an uncertainty of the SRV calculation, overlapping volume of SRV between stages of a stimulation treatment, or other information. The computing subsystem 110 can perform additional or different operations.

In one aspect of operation, the injection system 108 can perform an injection treatment, for example, by injecting fluid into the subterranean region 104 through the wellbore 102. The injection treatment can be, for example, a multi-stage injection treatment where an individual injection treatment is performed during each stage. The injection treatment can induce microseismic events in the subterranean region 104. Sensors (e.g., the sensors 136) or other detecting equipment in the well system 100 can detect the microseismic events, and collect and transmit the microseismic event data, for example, to the computing subsystem 110. The computing subsystem 110 can receive and analyze the microseismic event data. For instance, the computing subsystem 110 may identify an SRV, a fracture network, or other information related to the injection treatment based on the microseismic data. The information may be computed for an individual stage or for the multi-stage treatment as a whole. In some instances, the computed information can be presented to well operators, field engineers, or others to visualize and analyze the temporal and spatial evolution of the SRV. In some implementations, the microseismic event data can be collected, communicated, and analyzed in real time during an injection treatment. In some implementations, the computed information can be provided to the injection treatment control subsystem 111. A current or a prospective treatment strategy can be adjusted or otherwise managed based on the computed information, for example, to improve the efficiency of the injection treatment.

Some of the techniques and operations described here may be implemented by a computing subsystem configured to provide the functionality described. In various embodiments, a computing system may include any of various types of devices, including, but not limited to, personal computer systems, desktop computers, laptops, notebooks, mainframe computer systems, handheld computers, workstations, tablets, application servers, storage devices, computing clusters, or any type of computing or electronic device.

Figure 1B:
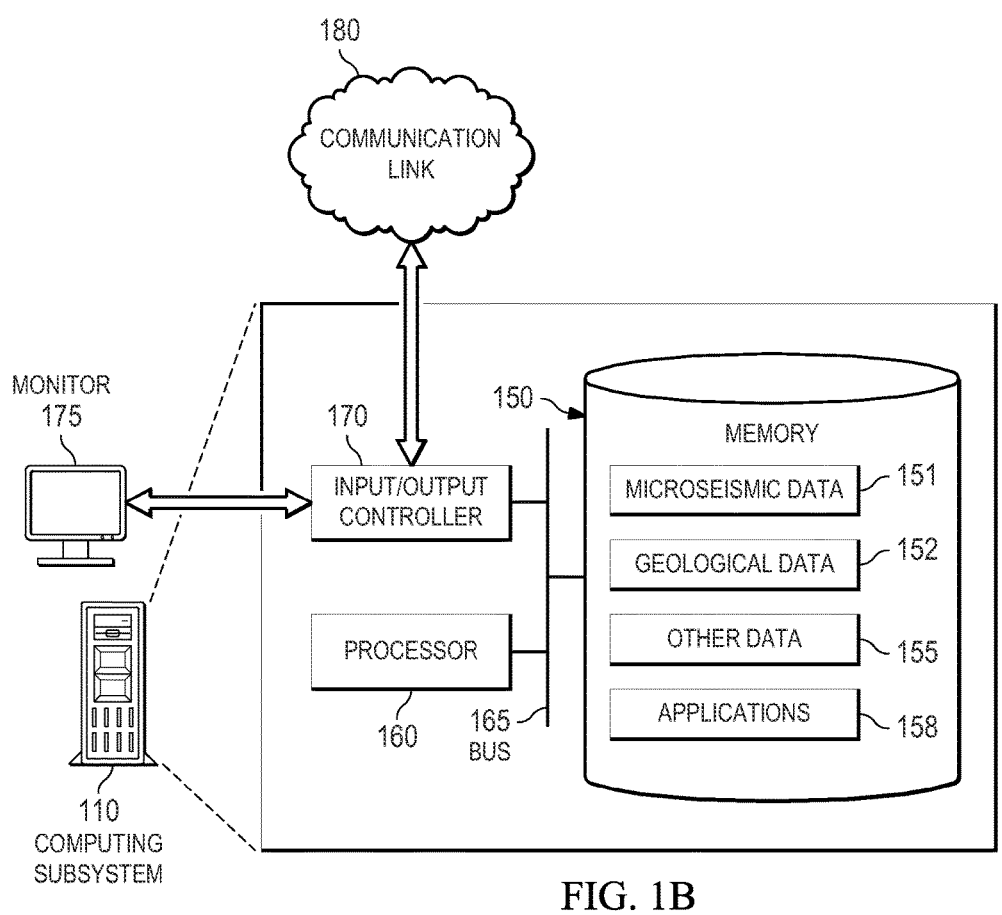
FIG. 1B is a diagram of the example computing subsystem 110 of FIG. 1A.

FIG. 1B is a diagram of the example computing subsystem 110 of FIG. 1A. The example computing subsystem 110 can be located at or near one or more wells of the well system 100 or at a remote location. All or part of the computing subsystem 110 may operate independent of the well system 100 or independent of any of the other components shown in FIG. 1A. The example computing subsystem 110 includes a memory 150, a processor 160, and input/output controllers 170 communicably coupled by a bus 165. The memory 150 can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner). In some examples, the input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing subsystem 110. As shown in FIG. 1B, the example memory 150 includes microseismic data 151, geological data 152, other data 155, and applications 158. In some implementations, a memory of a computing device includes additional or different data, applications, models, or other information.

The microseismic data 151 can include information on microseismic events in a subterranean area. For example, the microseismic data 151 can include information based on acoustic data detected at the wellbore 102, at the surface 106, or at other locations. The microseismic data 151 can include information collected by sensors 136. In some cases, the microseismic data 151 includes information that has been combined with other data, reformatted, or otherwise processed. The microseismic event data may include any suitable information relating to microseismic events (e.g., locations, times, magnitudes, moments, uncertainties, etc.). The microseismic event data can include data collected from one or more stimulation treatments, which may include data collected before, during, or after a fluid injection.

The geological data 152 can include information on the geological properties of the subterranean zone 104. For example, the geological data 152 may include information on the wellbore 102, or information on other attributes of the subterranean region 104. In some cases, the geological data 152 includes information on the lithology, fluid content, stress profile, pressure profile, spatial extent, or other attributes of one or more rock formations in the subterranean area. The geological data 152 can include information collected from well logs, rock samples, outcroppings, microseismic imaging, or other data sources.

The applications 158 can include software applications, scripts, programs, functions, executables, or other modules that are interpreted or executed by the processor 160. The applications 158 may include machine-readable instructions for performing one or more of the operations related to FIGS. 2-14. The applications 158 may include machine-readable instructions for generating a user interface or a plot, for example, illustrating fracture geometry (e.g., length, width, spacing, orientation, etc.), geometric representations of SRV, SRV overlap, SRV uncertainty, etc. (e.g., as shown in FIGS. 3-6, and 7A-7B). The applications 158 can obtain input data, such as treatment data, geological data, microseismic data, or other types of input data, from the memory 150, from another local source, or from one or more remote sources (e.g., via the communication link 180). The applications 158 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 158 by executing or interpreting the software, scripts, programs, functions, executables, or other modules contained in the applications 158. The processor 160 may perform one or more of the operations related to FIGS. 2-14. The input data received by the processor 160 or the output data generated by the processor 160 can include any of the microseismic data 151, the geological data 152, or the other data 155.

FIG. 2 is a plot 200 showing example microseismic event data collected from a multi-stage hydraulic fracturing treatment. In some implementations, a multi-stage hydraulic fracturing strategy can be used in long horizontal wells to improve stimulated reservoir volume. The multi-stage injection treatment may include individually treated stages and microseismic event data can be obtained for each stage. The plot 200 shows a subset 210 that includes 770 microseismic events (shown as circles) at Stage 1, a subset 220 that includes 1201 events (shown as squares) at Stage 2, a subset 230 that includes 476 events (shown as triangles) at Stage 3, and a subset 240 that includes 424 events (shown as diamonds) at Stage 4. A wellbore 250 and perforation clusters 260 for the example four-stage hydraulic fracturing treatment are also shown in FIG. 2.

Figure 3:
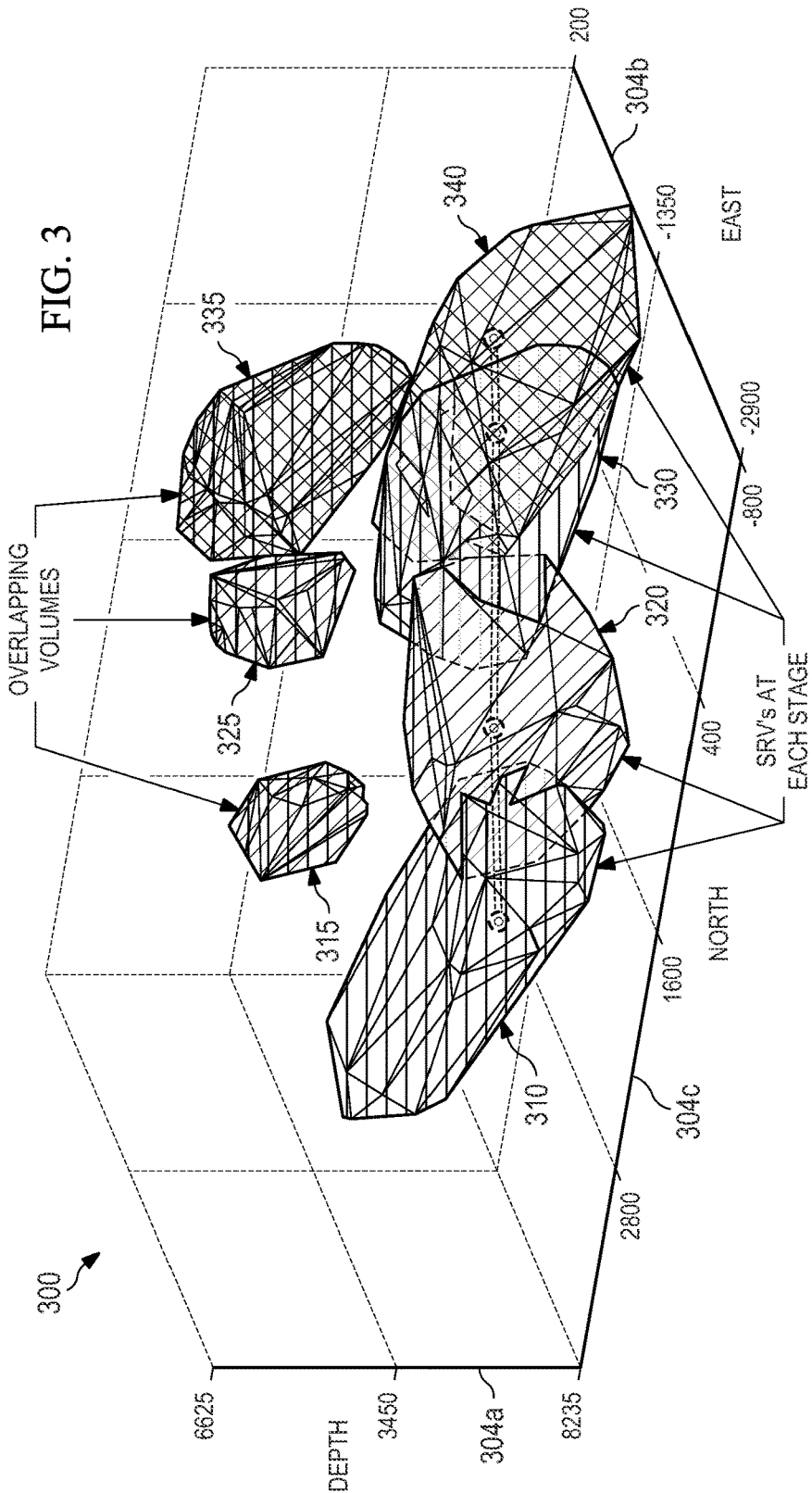
FIG. 3 is a plot showing an example three-dimensional (3D) representation of stimulated reservoir volume (SRV) boundaries calculated from microseismic event data collected from a multi-stage stimulation treatment.

FIG. 3 is a plot 300 showing example SRV boundaries calculated from example microseismic event data collected from a multi-stage injection treatment. In some instances, a boundary can be used to represent a stimulated subterranean region and the volume of the geometrical object enclosed by the boundary can represent the SRV generated by the stimulation treatment applied on the subterranean region. In some implementations, the SRV boundary can contain or intersect a set of microseismic event data points associated with the stimulation treatment (or an individual stage of the stimulation treatment). In the illustrated plot 300, boundaries 310, 320, 330, and 340 represent the SRVs for Stages 1-4 of the example four-stage hydraulic fracturing treatment, respectively. The boundaries 310, 320, 330, and 340 can be computed based on the microseismic event subsets 210, 220, 230, and 240 as shown in FIG. 2, respectively. The volumes of the SRVs associated with the four stages are $7.83 \ (10)^8$, $9.56 \ (10)^8$, $7.74 \ (10)^8$ and $8.73 \ (10)^8$ cubic feet ($ft^3$), respectively.

In some implementations, an SRV boundary can be calculated, for example, by iteratively identifying triangular facets with vertices at respective microseismic event locations. For example, computing the boundary can include calculating an initial boundary based on multiple microseismic events (e.g., events at extreme locations). The calculated boundary can be iteratively expanded based on the selected subset of microseismic events that reside outside the boundary. For example, a facet expansion operation may be performed that includes identifying facet expansion groups from the selected subset of microseismic events residing outside the boundary, and expanding facets of the calculated boundary to enclose microseismic events in the expansion groups. In some implementations, the boundary expansion operation can be performed iteratively and result in a boundary that encloses (i.e., contains or intersects) all the events in the selected subset while some other events (e.g., the filtered outliers, low density events, etc.) may reside outside the boundary. In some implementations, the boundary can be refined, for example, based on further filtering, smoothing vertices, edges, etc. Example techniques for computing an SRV boundary based on microseismic event data are described in U.S. patent application Ser. No. 13/975,985, filed on Aug. 26, 2013, entitled "Identifying a Simulated Reservoir Volume from Microseismic Data." Additional or different techniques can be used to compute an SRV boundary.

Figure 4:
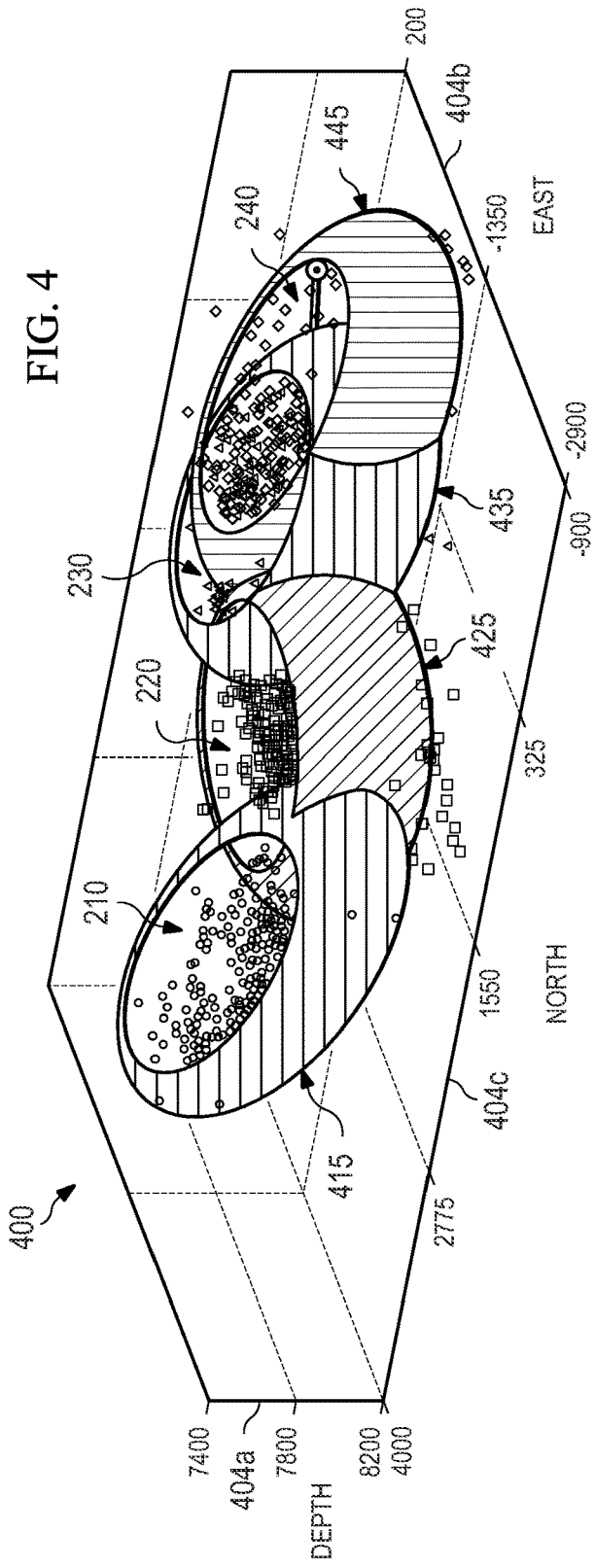
FIG. 4 is another plot showing example SRV boundaries calculated from microseismic event data collected from a multi-stage stimulation treatment.

FIG. 4 is a plot 400 showing additional example SRV boundaries calculated from example microseismic event data collected from the multi-stage injection treatment. The four ellipsoids 415, 425, 435, and 445 shown in FIG. 4 are SRV boundaries computed based on the four subsets of microseismic events 210, 220, 230, and 240 associated with Stage 1-4 of the example four-stage injection treatment, respectively. The ellipsoids 415, 425, 435, and 445 are open from the top to show the microseismic events. Some microseismic events are outside the boundaries 210, 220, 230, and 240 because they are outliners or events with very low event density.

Various algorithms and methods can be used to construct an ellipsoidal SRV boundary based on the microseismic event locations associated with a stimulation treatment. One example approach can include fitting an ellipsoid to a set of microseismic event locations. For example, the ellipsoidal SRV boundary can be computed according to a least square method such that the distances between the ellipsoid and the vertices of a computed SRV boundary (e.g., a convex hull) are minimized Example techniques for computing an ellipsoidal SRV boundary are described in U.S. patent application Ser. No. 14/010,079, filed on Aug. 26, 2013, entitled "Identifying an Axis of a Stimulated Reservoir Volume for a Stimulation Treatment of a Subterranean Region." In some implementations, additional or different techniques can be used to compute the SRV boundary.

In general, an SRV boundary can be of any appropriate shape, for example, a rectangle, a circle, a polygon, a sphere, an ellipsoid, a polyhedron, etc. The SRV boundary can be convex, concave, or have other geometric properties. In some implementations, the SRV boundary can have two dimensions, three dimensions, etc. In some implementations, an SRV boundary may be characterized by one or more SRV parameters (e.g., a length, width, height, orientation, major axis, center, radius, the number of vertices, the number of edges, size, etc.). The SRV parameters can be identified based on the computed SRV boundary. For instance, an ellipsoid in a Cartesian coordinate system can be characterized by nine parameters that include, a center, semi-lengths of x-axis, y-axis and z-axis, and rotation angles along these axes. In some implementations, the lengths of semi-axes can be used to approximate or otherwise represent the length, width and height of the SRV for the stimulated region and the rotation angles can be used to characterize the orientation of the SRV for the stimulated region. For instance, the length can be the length of the major axis of the ellipsoid; and the width can be the length of the secondary axis. In some instances, the length can be the spatial extent of the SRV boundary that is normal to the wellbore and the maximum stress direction, while the width can be the spatial extent of the SRV along the direction of the wellbore. In some implementations, additional or different SRV parameters can be identified to describe the properties of the stimulated region.

In some implementations, in addition to computing an SRV, a fracture network that includes multiple fracture planes can be identified based on the microseismic event data. FIG. 5 is a plot 500 showing example fracture networks 510, 520, 530, and 540 identified based on the four subsets of microseismic events 210, 220, 230, and 240 associated with Stages 1-4 of the example four-stage injection treatment, respectively. Each of the fracture networks can includes a primary fracture family. A primary fracture family can include a set of fractures having a primary orientation. In some cases, the primary orientation of a fracture family is influenced by a maximum stress direction or other stress-related properties of the subterranean region. In the example shown in FIG. 5, the primary fracture families of the fracture networks 510, 520, 530, and 540 include 13, 20, 14, and 15 fracture planes, respectively.

In some implementations, the fracture planes (and the parameters describing the fracture planes) can be identified based on microseismic data by, for example, fracture a matching software program such as Halliburton's "Foray 3D Microseismic Fracture Matching Services," or other techniques may be used. In some implementations, a real-time development of the hydraulic fractures can be identified, tracked, and visually presented, for example, by Halliburton's "Foray 3D Real Time Microseismic Fracture Matching Services," or other techniques may be used. Example techniques for identifying a fracture network and its associated fracture planes are described in PCT App. No. PCT/US2011/032741, filed on Apr. 15, 2011, entitled "Systems and Methods for Hydraulic Fracture Characterization Using Microseismic Event Data," and in U.S. application Ser. No. 13/646,093, filed on Oct. 5, 2012, entitled "Analyzing Fracture Stratigraphy." In some implementations, additional or different techniques can be used to identify a fracture network or fracture pattern in a stimulated subterranean region.

In some implementations, the characteristics of the fracture network can be represented by fracture network parameters that include, for example, an azimuth angle, dip angle, length, width, height, fracture density, and fracture spacing of the fracture network. In some implementations, the fracture network parameters can include statistical parameters of the fracture planes in the fracture network. For example, the fracture network parameters can be obtained by averaging the respective parameters of the multiple fracture planes in a primary fracture family, or the fracture network parameters can be obtained in another manner.

FIGS. 6-9 are tables listing example SRV parameters of a stimulated region affected by a multi-stage hydraulic fracturing process and example fracture network parameters of the fracture network at the multiple stages. The SRV parameters are example parameters of the SRV boundaries 410, 420, 430, and 440 in FIG. 4 computed based on the example the microseismic event subsets 210, 220, 230, and 240 in FIG. 2 for Stage 1-4 of the stimulation treatment, respectively. The fracture network parameters are example parameters of the fracture network 510, 520, 530, and 540 computed based on the example the microseismic event subsets 210, 220, 230, and 240 in FIG. 2, respectively. Tables 1-4 include the SRV parameters and fracture network parameters for each of the four stages, respectively. Example SRV parameters include the SRV's volume, length, width, height, and azimuth. In Tables 1-4, the SRVs' azimuths are north to east and can be another direction in other examples. Example fracture network parameters include fracture azimuth, fracture dip angle, fracture length, fracture height and fracture spacing (or density). In the tables shown, the fracture network parameters are denoted by $\mu \pm \sigma$ where $\mu$ is the mean and $\sigma$ is the standard deviation over the fracture plane samples. The fracture azimuths are north to east as well. In some instances, multiple fracture families may be identified for a treatment stage, for example, by the fracturing matching algorithm. The illustrated fracture network parameters are parameters of the primary fracture family (e.g., collected based on the parameters of the fracture planes in the primary fracture family). Tables 1-4 also include the number of fracture planes in the primary fracture family for each of the treatment stage.

The correlations between the SRV parameters and fracture network parameters can reveal relationships between the geometry of hydraulic fracture network and that of the stimulated rock. In the example shown, the length and height of hydraulic fracture network are proportional to the stimulated rock's length and height, respectively. Among four treatment stages, Stages 1-4, the fractures at Stage 1 have the maximum average length of 2788 (ft), which is nearly twice as the average length of fractures at other three stages. The maximum average length of the fracture network can provide insights on the maximum lateral extension of the stimulated rock, which is 3676.3 (ft) in this example. Thus, the length of the fracture network can provide reliable information about the length of the stimulated rock, and vice versa. In the illustrated example, the extension direction of hydraulic fractures is nearly normal to the direction of the wellbore. This lateral extension to the un-fractured reservoir can play an important role in estimating the performance of hydraulic fracture stimulation. As another example, Stage 1 has the minimum SRV height of 648.34 (ft); and correspondingly it has the minimum average fracture height of 470.2 (ft) among all four stages. Accordingly, a spatial extent of the SRV can have a positive correlation with the corresponding spatial extent of the fracture network. In some implementations, one can be used to estimate, approximate, predict, confirm, or otherwise determine another.

In some implementations, the width of SRV can be directly related to the number of hydraulic fractures in the primary fracture family. For example, the SRV at Stage 2 has the largest width of 1604.84 (ft), which is generally parallel to the long axis of the wellbore. Stage 2 also has the greatest number of hydraulic fractures, 20. In some implementations, using an SRV's width and fracture spacing, the maximum number of fractures within a given SRV can be estimated by $$\text{maximum number of fractures} = \text{the SRV's width}/\mu, \qquad (1)$$

where $\mu$ is the average of fracture spacing in the primary fracture family. Based on Equation (1), the maximum numbers of fractures for Stages 1 to 4 are 16, 24, 17, and 21 respectively. Compared with the actual number of fractures, 13, 20, 14, 15 for Stages 1 to 4, these estimates reflect the relative width among the stages. For example, the smallest SRV width gives the smallest number of fractures, 13, at stage 1. The fracture spacing density can describe the distribution of hydraulic fractures within the stimulated rock. Tables 1-4 show that Stage 1 and 2 have similar fracture spacing densities, with an average spacing density of 64.8 (ft), while fractures at Stages 3 and 4 have similar densities with average density of 76.5 (ft).

In some implementations, quantitative analysis can identify correlations between the fracture orientation azimuths and the stimulated rock orientation azimuths. For instance, FIGS. 3 and 5 and Tables 1-4 show that the fracture orientation azimuths at the four stages are consistent with their respective stimulated rock orientation azimuths. For example, the fracture azimuth at Stage 2 is N41.6° E while the SRV's azimuth is N38.2° E with difference of only 3.4°. In some instances, by analyzing the overlapping volume or other parameters between two or more stages, similarities between two or more stages in terms of the stimulated rock and fracture network can be identified. For example, due to the close connection and interaction between Stage 3 and Stage 4 (e.g., as illustrated by the large overlapping volume in FIGS. 3 and 4), Stages 3 and 4 have more similar geometry while Stage 1 is more similar to Stage 2. In addition to fracture spacing density, SRV's azimuth of N38.96° E at Stage 1 is very close to N38.15° E at Stage 2 while the fracture azimuths at Stages 1 and 2 are also similar (N37.37° E average). SRV's azimuth of N53.25° E at Stage 3 is very close to that of N55.26° E at Stage 4 while fracture azimuths at Stages 3 and 4 are also similar (N54° E average).

Figures 12A, 12B:
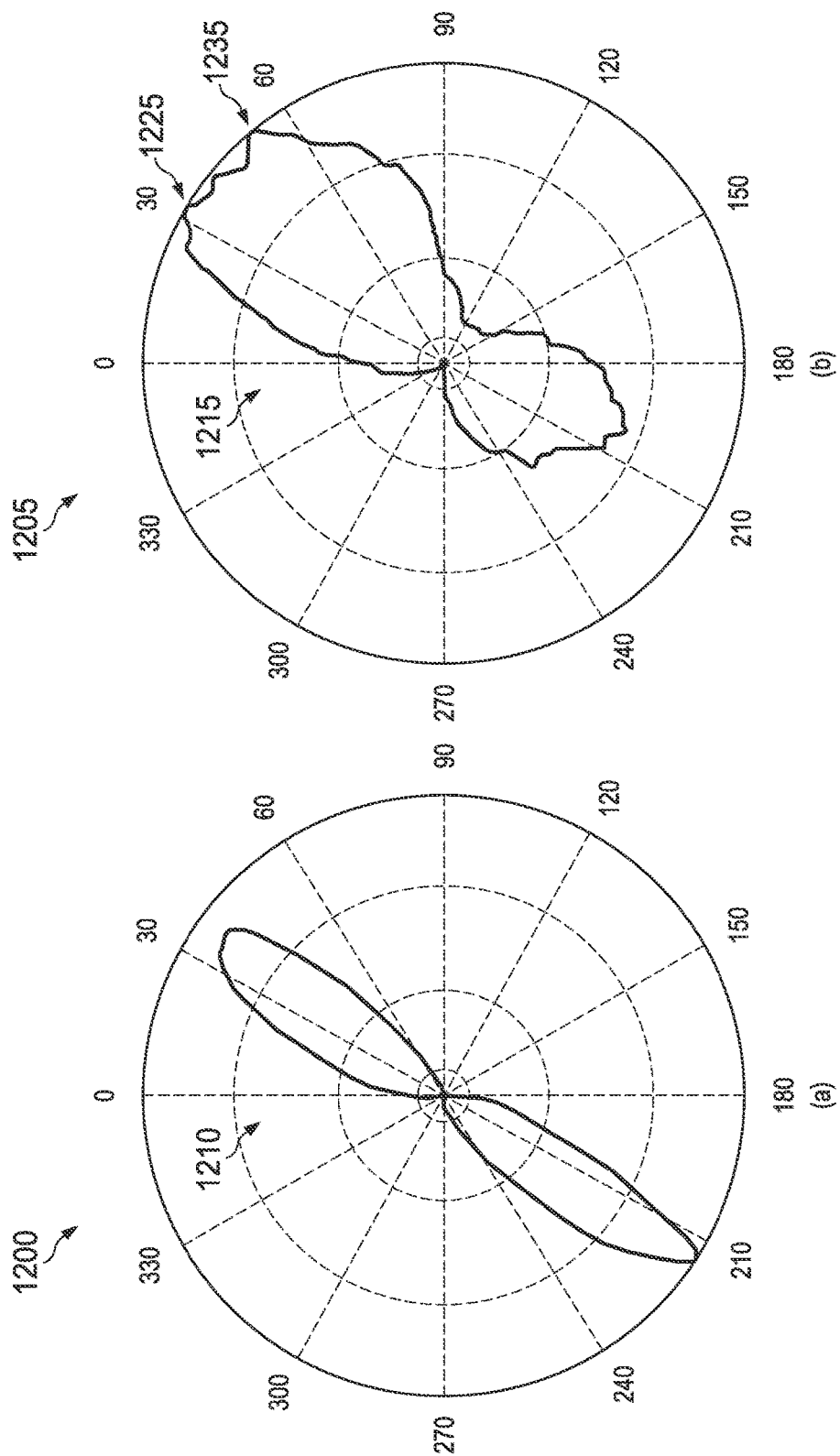
FIG. 12A-B are rose diagrams showing example probabilities of fracture orientations of two fracture networks generated by application of two respective stages of a multi-stage stimulation treatment.

In some implementations, the complexity of a hydraulic fracture network can be shown, for example, by rose-diagrams of fracture orientations. FIG. 12A is a rose-diagram 1200 representing the probability distribution of the fracture orientations of the fracture network 510 at Stage 1; and FIG. 12B is a rose-diagram 1205 generated by the probability distribution of the fracture orientations of the fracture networks 540 at Stage 4. FIG. 12A shows a single fracture orientation trend 1210 of the fracture network 510 while FIG. 12B shows multiple fracture orientation trends 1215 (e.g., including multiple distribution peaks 1225, 1235) of the fracture network 540. The multiple fracture orientation trends of Stage 4 indicate a more complex fracture network of Stage 4 than Stage 1.

The complexity of a hydraulic fracture network can also be quantified by SRV parameters. For example, a fracture complexity index (FCI) can be defined by the ratio of the SRV width over the SRV length. Based on the example SRV parameters shown in Tables 1-4, the FCI of Stages 1 to 4 are 0.288, 0.697, 0.5681, and 0.685, respectively. Both the rose-diagrams and FCIs indicate that hydraulic fracture network at Stage 4 has more complex structures than Stage 1. This can be explained, for example, by the complex connection and interaction illustrated by the large overlapping volume in FIG. 3.

In some instances, physical connection or fluid communication can exist between stimulated regions of multiple stages. The SRVs for two or more stages may overlap with each other. The overlapping volume of SRVs and the overlap of boundaries can be identified based on the microseismic event data. The SRV analysis can provide quantitative measures of fractured rock volume and stimulation effectiveness for the reservoirs. For example, with the largest width of 1604.84 (ft) and the greatest height of 807.9 (ft), the SRV at Stage 2 has the maximum volume, $9.57 \times 10^8$ (ft$^3$). The SRVs at Stages 1, 3 and 4 are 7.83, 7.74, and $8.73 \times 10^8$ (ft$^3$), respectively. In some implementations, overlapping rock volume intersected by two treatment stages can be computed, for example, based on the common microseismic events shared by the two stages and shared points intersected by edges of one stage's SRV and facets of another stage's SRV. FIG. 3 shows the overlapping volume 315 intersected by the SRV boundary 310 of Stage 1 and the SRV boundary 320 of Stage 2, overlapping volume 325 intersected by the SRV boundary 320 of Stage 2 and SRV boundary 330 of Stage 3, and overlapping volume 335 intersected by the SRV boundary 330 of Stage 3 and the SRV boundary 340 of Stage 4.

Table 5 shows the volumes of the overlapping regions between two adjacent stages and their respective percentages with respect to the SRV of the latter of the two adjacent stages. For example, the overlapping volume 315 is $8.56 \times 10^7$ (ft$^3$) occupying 9.0% over the SRV of Stage 2; the overlapping volume 325 is $9.09 \times 10^7$ (ft$^3$) occupying 11.7% over the SRV of Stage 3, the overlapping volume 335 is $4.16 \times 10^8$ (ft$^3$) occupying 47.7% over the SRV of Stage 4. In some instances, the low overlapping volume can imply that the majority of the treatment fluid has contributed, for example, to generating new hydraulic fractures, opening the existing fractures and propagating the generated fractures. The high percentage of overlapping volume (e.g., between Stage 3 and Stage 4) may imply the great diversion of the treatment fluid (e.g., from Stage 4 to previous fractured zone). Additional information can be obtained from the SRV analysis.

For the multi-stage treatment illustrated in FIGS. 2-5, the overall total effective SRV can be calculated by equation (2):

$$\text{Total ESRV}(U_{i=1}^4 \text{stage}(i)) = \Sigma_{i=1}^4 \text{SRV}(\text{stage}(i)) - \Sigma_{i=1}^3 \text{SRV}(\text{stage}(i) \cap \text{stage}(i+1)) \qquad (2)$$

yielding $2.7945 \times 10^9$ (ft$^3$).

Generally, a total effective SRV for the multi-stage injection treatment can be identified based on the SRV for each stage and the overlapping volume between stages. Specifically, the total effective SRV for an m-stage hydraulic fracturing treatment can be, for example, given by equation (3):

$$\text{Total } ESRV\left(\bigcup_{i=1}^{m} \text{stage}(i)\right) = \qquad (3)$$

$$\sum_{i=1}^{m} SRV(\text{stage}(i)) - \sum_{i>j} SRV(\text{stage}(i) \cap \text{stage}(j)) +$$

$$\sum_{i>j>k} SRV(\text{stage}(i) \cap \text{stage}(j) \cap \text{stage}(k)) - \ldots +$$

$$(-1)^m SRV\left(\bigcap_{i=1}^{m} \text{stage}(i)\right)$$

In some implementations, the total effective SRV can be calculated according to a variation of equation (2) or (3), or in another manner.

In some implementations, to measure the contribution weight of each treatment stage to the total effective SRV of the multi-stage stimulation treatment, the effective SRV at each stage can be calculated by equation (4), or a variation thereof:

$$\text{Effective SRV}(\text{stage}(i)) = SRV(\text{stage}(i)) - \Sigma_{i>j} SRV(\text{stage}(i) \cap \text{stage}(j)) \qquad (4)$$

for i=2, 3, . . . . The stimulation effectiveness for an individual stage can be given by equation (5), or a variation thereof:

$$\text{Effectiveness} = \frac{\text{Effective } SRV \text{ (stage}(i))}{SRV \text{ (stage}(i))}. \qquad (5)$$

Figure 13A:
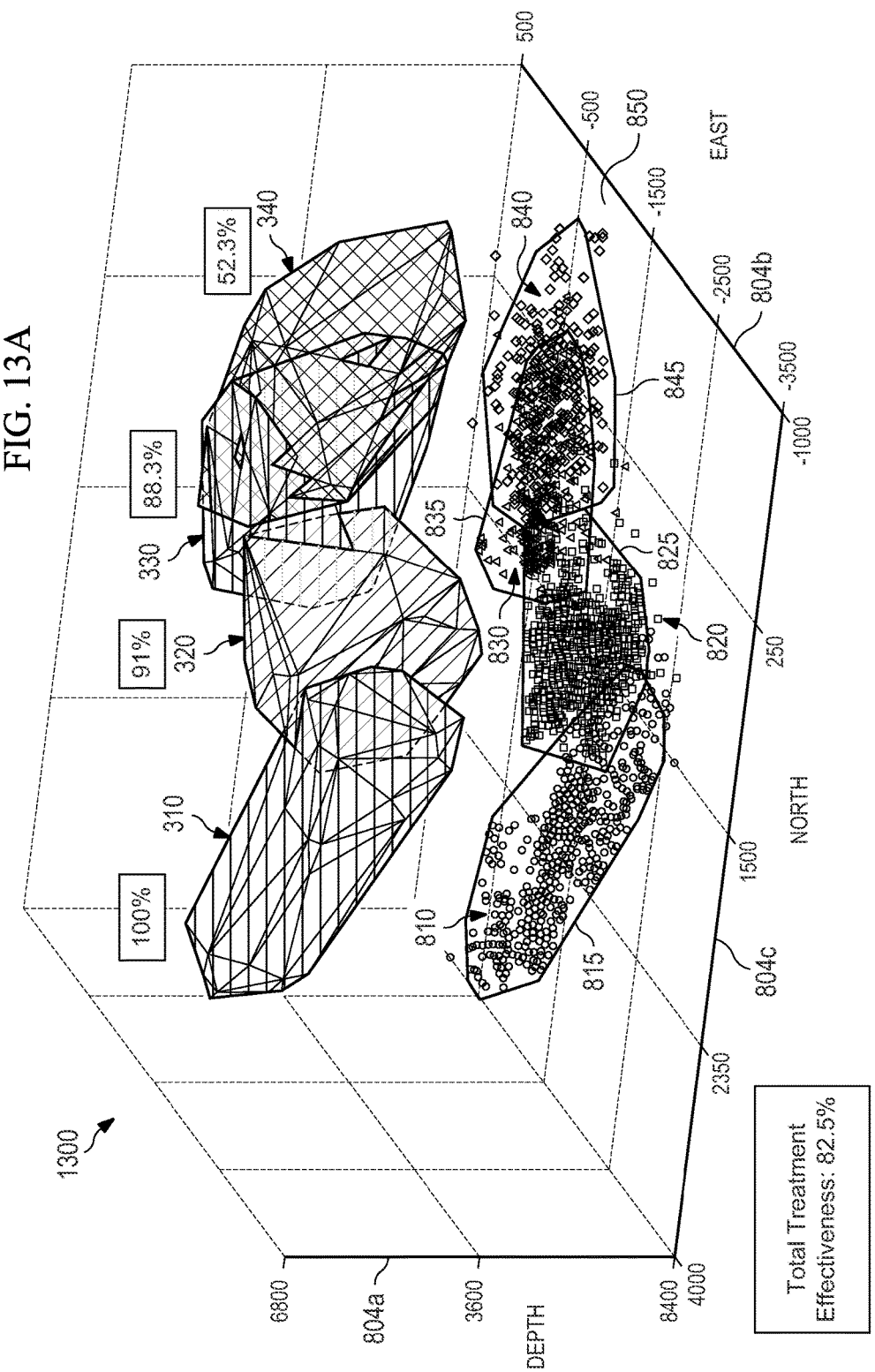
FIG. 13A is a plot showing an example total treatment effectiveness of a multi-stage stimulation treatment and example stimulation effectiveness of individual treatment stages.
Figure 13B:
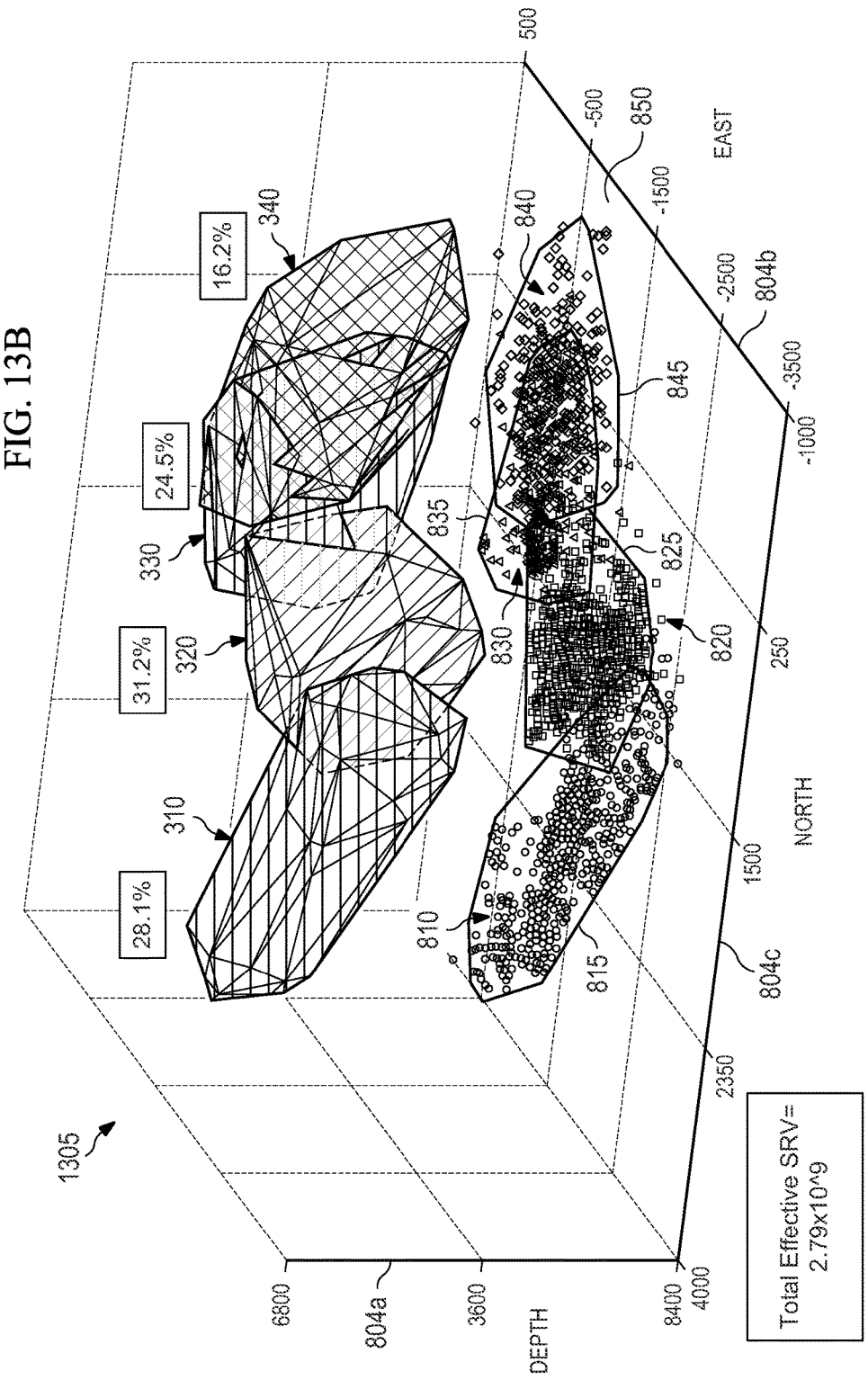
FIG. 13B is a plot showing an example total effective SRV of the multi-stage stimulation treatment and each stage's contribution to the total effective SRV.

FIG. 13A is a plot 1300 showing an example total stimulation effectiveness of a multi-stage stimulation treatment and example stimulation effectiveness of individual treatment stages. Table 6 also lists the stimulation effectiveness of each stage's hydraulic fracturing treatment, which are 100%, 91%, 88.3% and 52.3% for Stages 1-4, respectively. The overall stimulation effectiveness for this wellbore treatment is 82.5%, which can be obtained, for example, by the total effective SRV (e.g., as obtained according to equation (2)) divided by the sum of the SRVs of the four stages. FIG. 13B is a plot 1305 showing an example total effective SRV of the multi-stage stimulation treatment and each stage's contribution to the total effective SRV. The total effective SRV of the example four-stage stimulation treatment is $2.7945 \times 10^9$ (ft$^3$) according to equation (2). Table 6 also lists the contribution of each of Stages 1-4's stimulation to the overall wellbore treatment, which are 28.1%, 31.2%, 24.5% and 16.2%, respectively. The larger amount of the overlapping volume between Stage 3 and Stage 4 leads to the low effectiveness of hydraulic fracturing stimulation at Stage 4. In some instances, the effectiveness of a stimulation treatment can be improved or maximized by reducing or minimizing SRV overlap between two adjacent injection stages. Improving fracturing effectiveness via overlap reduction can help reduce costs or provide other benefits in some instances.

Figure 14:
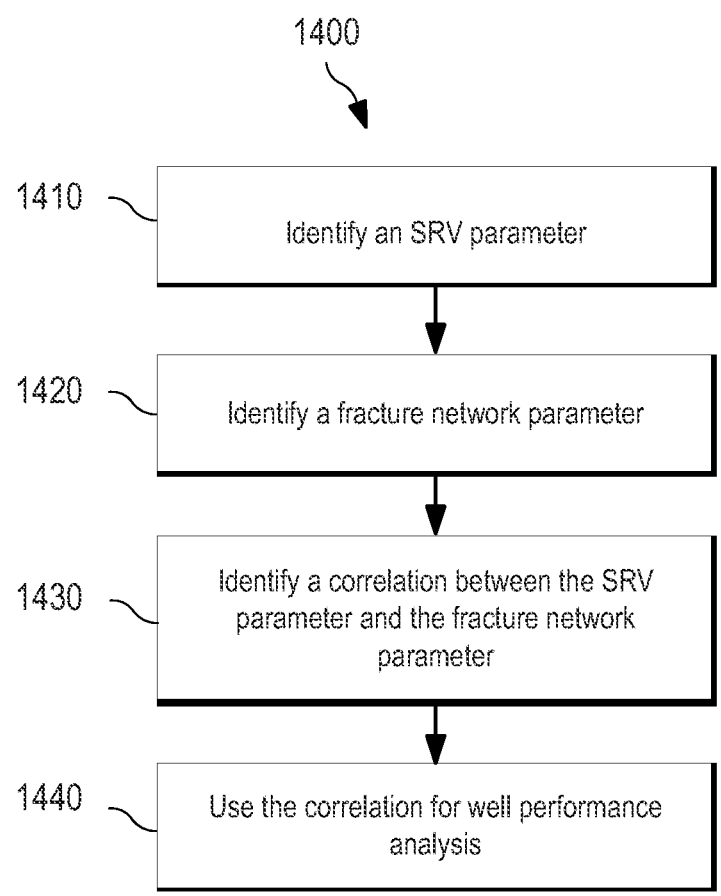
FIG. 14 is a flow chart showing an example technique for identifying a correlation between an SRV parameter and a fracture network parameter associated with a stimulation treatment of a subterranean region.

FIG. 14 is a flow chart showing an example process 1400 for identifying a correlation between an SRV parameter and a fracture network parameter for a stimulation treatment of a subterranean region. All or part of the example process 1400 may be computer-implemented, for example, using the features and attributes of the example computing subsystem 110 shown in FIG. 1B or other computing systems. The process 1400, individual operations of the process 1400, or groups of operations may be iterated or performed simultaneously to achieve a desired result. In some cases, the process 1400 may include the same, additional, fewer, or different operations performed in the same or a different order. The process 1400 may be performed on site near a wellbore, at a remote location, or in another location.

At 1410, an SRV parameter for a stimulation treatment of a subterranean region can be identified. The stimulation treatment can be a single-stage injection treatment or a multi-stage injection treatment. The injection treatment may be performed, for example, by the well system 100 in FIG. 1A or by another type of system. The stimulation treatment can induce hydraulic fractures in the subterranean region and generate an SRV in the stimulated subterranean region.

The stimulation treatment can induce and generate microseismic events in the subterranean region. In some implementations, the SRV can be computed and SRV parameters can be identified based on the microseismic event data, for example, according to the example techniques described with respect to FIGS. 2-4, or other techniques. The SRV parameters can include any parameter that describes the shape, size, orientation, or other properties of the stimulated reservoir. For example, the SRV parameters can include one or more of, a length, a width, a height, an orientation, a volume, an overlapping volume, or any other parameters of the SRV. The SRV parameters can be identified, for example, based on the SRV boundaries computed based on the microseismic event data. For instance, the length, width, height, and orientation of an ellipsoidal SRV boundary can be obtained based on the three semi-axes of the ellipsoid. Additional or different techniques can be used to identify the SRV parameters.

At 1420, a fracture network parameter (also referred to as a "fracture-plane network parameter") for a fracture network generated by application of the stimulation treatment of the subterranean region can be identified. In some instances, the fracture network (also referred to as a "fracture-plane network") is a collection of fracture planes that are identified, for example, by fracture mapping or matching techniques based on microseismic event data according to the example techniques described with respect to FIG. 5, or other techniques. The fracture network parameters can include any parameter that describes the fracture geometry, distribution or other properties. For example, the fracture network parameters can include fracture orientation (e.g., azimuth, dip angle), fracture size (e.g., length, height, area), fracture spacing density and fracture complexity. The fracture network parameters can provide the detailed information about hydraulic fractures inside the SRV.

In some implementations, identifying the SRV parameter and identifying the fracture network parameter can be performed sequentially or in parallel. For example, some or all of the operations at 1410 and 1420 can be distributed over two or more processor and be executed simultaneously. In some implementations, some or all of the operations at 1410 and 1420 can be performed by a single processor or a single computer system; or they may be performed independently of each other by two or more processors or systems. The operations at 1410 and 1420 can be performed in another manner.

At 1430, a correlation between the SRV parameter and the fracture network parameter can be identified. The correlation can be a quantitative or qualitative relationship (e.g., an equation or a trend) between one or more SRV parameters, fracture network parameters, and possibly other parameters. In some instances, relationships between the physical geometry of the SRVs and that of the fracture network can be identified, for example, to characterize the stimulation treatment. Example techniques for identifying correlations between the SRV parameter and the fracture network parameter are described with respect to Tables 1-6 and FIGS. 12A-B and 13A-B. Additional or different correlations between the SRV parameter and the fracture network parameter can be identified. In some instances, possible correlations between some of the SRV parameters and some of the fracture network parameters are identified.

As one example, the SRV parameter can include a spatial extent of the SRV; the fracture network parameter can include a spatial extent of the fracture network; and identifying the correlation between the SRV parameter and the fracture network parameter can include identifying a proportionality between the spatial extent of the SRV and the spatial extent of the fracture network. For example, the spatial extent can be a length, width, or height of the SRV and the fracture network, respectively. As another example, the SRV parameter can include a width of the SRV; the fracture network parameter can include a fracture spacing of the fracture network; and identifying the correlation between the SRV parameter and the fracture network parameter can include determining a number of fractures within the SRV based on the width of the SRV and the fracture spacing of the fracture network, for example, according to equation (1). As yet another example, the SRV parameter can include an orientation of the SRV; the fracture network parameter can include an orientation of the fracture network; and identifying the correlation between the SRV parameter and the fracture network parameter can include identifying a correlation between the orientation of the SRV and the orientation of the fracture network. For example, the orientation of the SRV and the orientation of the fracture network can be consistent with each other (e.g., the difference is within a threshold). As yet another example, the SRV parameter can include a length and a width of the SRV; the fracture network parameter can include a probability distribution of orientations of the fracture network; and identifying the correlation between the SRV parameter and the fracture network parameter can include identifying a correlation between a number of peaks of the probability distribution of orientations of the fracture network (e.g., as shown in a rose diagram) and a fracture complexity index determined based on the ratio of the width to the length of the SRV.

In some implementations, a stimulation effectiveness of a stimulation treatment and an individual stage of the stimulation treatment, and a contribution of an individual stage of the stimulation treatment to the overall stimulation treatment can be identified. These parameters can be identified, for example, according to the example techniques described with respect to FIGS. 13A-B and Tables 5-6, or in another manner. For example, a stimulation effectiveness of an individual stage can be identified based on a ratio of the effective SRV to the SRV of the individual stage. A contribution of an individual stage of the stimulation treatment to the overall stimulation treatment can be identified based on a ratio of the effective SRV of the individual stage to a total effective SRV of the stimulation treatment.

At 1440, the correlation can be used for treatment analysis. In some implementations, SRV parameters can be used to predict, confirm, approximate or otherwise determine the fracture network parameters, and vice versa, for example, based on their correlations. In some implementations, the SRV parameters and the fracture network parameters can be combined to provide a more comprehensive understanding of the subterranean region. In some implementations, not only boundary conditions of hydraulic fracture network but also detailed data of individual hydraulic fracture geometry and distribution can be determined. The SRV parameters and fracture network parameters can be used, for example, in applying complex fracture propagation models, in predicting hydrocarbon production, in estimating treatment well performance, etc. In some instances, a current or a prospective injection plan (e.g., injection schedules of future treatment stages, parameters of injection treatment, diversion techniques, etc.) can be adjusted based on the correlations of the SRV parameters and fracture network parameters.

In some instances, the computed SRV boundaries, identified the fracture network, their respective parameters, and their correlations can be can be displayed, for example, via a user interface on a screen or another type of display apparatus. For instance, one or more of the example SRV boundaries, the fracture networks, SRV parameters and fracture network parameters may be displayed on a use interface automatically or based on users' requests, for example, as shown in FIGS. 2-5, 12A-B, and 13A-B and Tables 1-6, or in other manner. In some implementations, one or more of the SRV parameters and fracture network parameters can be displayed, contrasted, automatically analyzed or otherwise manipulated to display or otherwise provide their correlations. In some implementations, some or all of the results can be displayed, for example, in real time (or substantially real time) during a stimulation treatment to allow field engineers, operational engineers and analysts, and others to better visualize, learn, or otherwise analyze the subterranean region and manage the stimulation treatment accordingly.

In some implementations, some or all of the operations in the example process 1400 are executed in real time during a stimulation treatment. An operation can be performed in real time, for example, by performing the operation in response to receiving data (e.g., from a sensor or monitoring system) without substantial delay. An operation can be performed in real time, for example, by performing the operation while monitoring for additional microseismic data from the stimulation treatment. Some real-time operations can receive an input and produce an output during a fracture treatment; in some instances, the output is made available to a user within a time frame that allows the user to respond to the output, for example, by modifying the fracture treatment.

In some cases, some or all of the operations in the example process 1400 are executed dynamically during a fracture treatment. An operation can be executed dynamically, for example, by iteratively or repeatedly performing the operation based on additional inputs, for example, as the inputs are made available. In some instances, dynamic operations are performed in response to receiving data for a new microseismic event (or in response to receiving data for a certain number of new microseismic events, etc.).

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. A computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of examples have been described. Various modifications can be made without departing from the scope of the present disclosure. Accordingly, other embodiments are within the scope of the following claims.

The invention claimed is:

1. A method of analyzing a stimulation treatment of a subterranean region, the method comprising:
   identifying, by operation of a computer system, a stimulated reservoir volume (SRV) parameter of a stimulation treatment applied to a subterranean region based on microseismic event data associated with the stimulation treatment;
   identifying, by operation of the computer system, a fracture-plane network parameter of a fracture-plane network generated by application of the stimulation treatment based on the microseismic event data;
   identifying a correlation between the SRV parameter and the fracture-plane network parameter; and
   using the correlation to analyze the stimulation treatment.

2. The method of claim 1, wherein the SRV parameter and the fracture-plane network parameter are associated with an individual stage of a multi-stage stimulation treatment of the subterranean region.

3. The method of claim 1, further comprising identifying a stimulation effectiveness of the stimulation treatment.

4. The method of claim 1, further comprising identifying a contribution of an individual stage of a multi-stage stimulation treatment based on a ratio of an effective SRV of the individual stage to a total effective SRV of the multi-stage stimulation treatment.

5. The method of claim 1, wherein the SRV parameter comprises a spatial extent of the SRV, the fracture-plane network parameter comprises a spatial extent of the fracture-plane network, and identifying the correlation comprises identifying a proportionality between the spatial extent of the SRV and the spatial extent of the fracture-plane network.

6. The method of claim 5, wherein the spatial extent of the SRV comprises a length or height of the SRV, and the spatial extent of the fracture-plane network comprises a length or height of the fracture-plane network.

7. The method of claim 1, wherein the SRV parameter comprises a width of the SRV, the fracture-plane network parameter comprises a number of fractures in the fracture-plane network, and identifying the correlation comprises identifying a correlation between the number of fractures and the width of the SRV.

8. The method of claim 1, wherein the SRV parameter comprises an orientation of the SRV, the fracture-plane network parameter comprises an orientation of the fracture-plane network, and identifying the correlation comprises identifying a correlation between the orientation of the SRV and the orientation of the fracture-plane network.

9. The method of claim 1, wherein the SRV parameter comprises a fracture complexity index, the fracture-plane network parameter comprises a probability distribution of orientations of the fracture-plane network, and identifying the correlation comprises identifying a correlation between a number of peaks of the probability distribution and the fracture complexity index.

10. A non-transitory computer-readable medium storing instructions that, when executed by data processing apparatus, cause the data processing apparatus to perform operations comprising:
   identifying a stimulated reservoir volume (SRV) parameter of a stimulation treatment applied to a subterranean region based on microseismic event data associated with the stimulation treatment;
   identifying a fracture-plane network parameter of a fracture-plane network generated by application of the stimulation treatment based on the microseismic event data;
   identifying a correlation between the SRV parameter and the fracture-plane network parameter; and
   using the correlation to analyze the stimulation treatment.

11. The computer-readable medium of claim 10, wherein the SRV parameter comprises a spatial extent of the SRV, the fracture-plane network parameter comprises a spatial extent of the fracture-plane network, and identifying the correlation comprises identifying a proportionality between the spatial extent of the SRV and the spatial extent of the fracture-plane network.

12. The computer-readable medium of claim 10, wherein the SRV parameter comprises a width of the SRV, the fracture-plane network parameter comprises a number of fractures in the fracture-plane network, and identifying the correlation comprises identifying a correlation between the number of fractures in the fracture-plane network and the width of the SRV.

13. The computer-readable medium of claim 10, wherein the SRV parameter comprises an orientation of the SRV, the fracture-plane network parameter comprises an orientation of the fracture-plane network, and identifying the correlation comprises identifying a correlation between the orientation of the SRV and the orientation of the fracture-plane network.

14. The computer-readable medium of claim 10, wherein the SRV parameter comprises a fracture complexity index, the fracture-plane network parameter comprises a probability distribution of orientations of the fracture-plane network, and identifying the correlation comprises identifying a correlation between a number of peaks of the probability distribution and the fracture complexity index.

15. A computing system comprising
   data processing apparatus; and
   memory storing computer-readable instructions that, when executed by the data processing apparatus, cause the data processing apparatus to perform operations comprising:
      identifying a stimulated reservoir volume (SRV) parameter of a stimulation treatment applied to a subterranean region based on microseismic event data associated with the stimulation treatment;
      identifying a fracture-plane network parameter of a fracture-plane network generated by application of the stimulation treatment based on the microseismic event data;
      identifying a correlation between the SRV parameter and the fracture-plane network parameter; and
      using the correlation to analyze the stimulation treatment.

16. The computing system of claim 15, the operations further comprising identifying a stimulation effectiveness of the stimulation treatment of the subterranean region.

17. The computing system of claim 15, the operations further comprising identifying a contribution of an individual stage of a multi-stage stimulation treatment based on a ratio of an effective SRV of the individual stage to a total effective SRV of the multi-stage stimulation treatment.

18. The computing system of claim 15, wherein the SRV parameter comprises a width of the SRV, the fracture-plane network parameter comprises a number of fractures in the fracture-plane network, and identifying the correlation comprises identifying a correlation between the number of fractures and the width of the SRV.

19. The computing system of claim 15, wherein the SRV parameter comprises a fracture complexity index, the fracture-plane network parameter comprises a probability distribution of orientations of the fracture-plane network, identifying the correlation comprises identifying a correlation between a number of peaks of the probability distribution and the fracture complexity index, and the computing system comprises a display device operable to display a rose diagram representing the probability distribution.

* * * * *

UNITED STATES PATENT AND TRADEMARK OFFICE
CERTIFICATE OF CORRECTION

PATENT NO. : 10,120,089 B2
APPLICATION NO. : 15/129768
DATED : November 6, 2018
INVENTOR(S) : Jianfu Ma, Avi Lin and Baidurja Ray Page 1 of 1

It is certified that error appears in the above-identified patent and that said Letters Patent is hereby corrected as shown below:

In the Specification

In Column 5, Line 41, after --ground surface-- delete "160" and insert --106--

In Column 6, Line 52, delete "installed at the surface 160 and beneath the surface 160 (e.g.," and insert --installed at the surface 106 and beneath the surface 106 (e.g.,--

Signed and Sealed this
Twenty-fifth Day of December, 2018

Andrei Iancu
*Director of the United States Patent and Trademark Office*